Oct. 15, 1968      C. MASCHERPA      3,405,795
APPARATUS FOR STOWING AND CONVEYING ARTICLES
Filed June 13, 1966      4 Sheets-Sheet 1
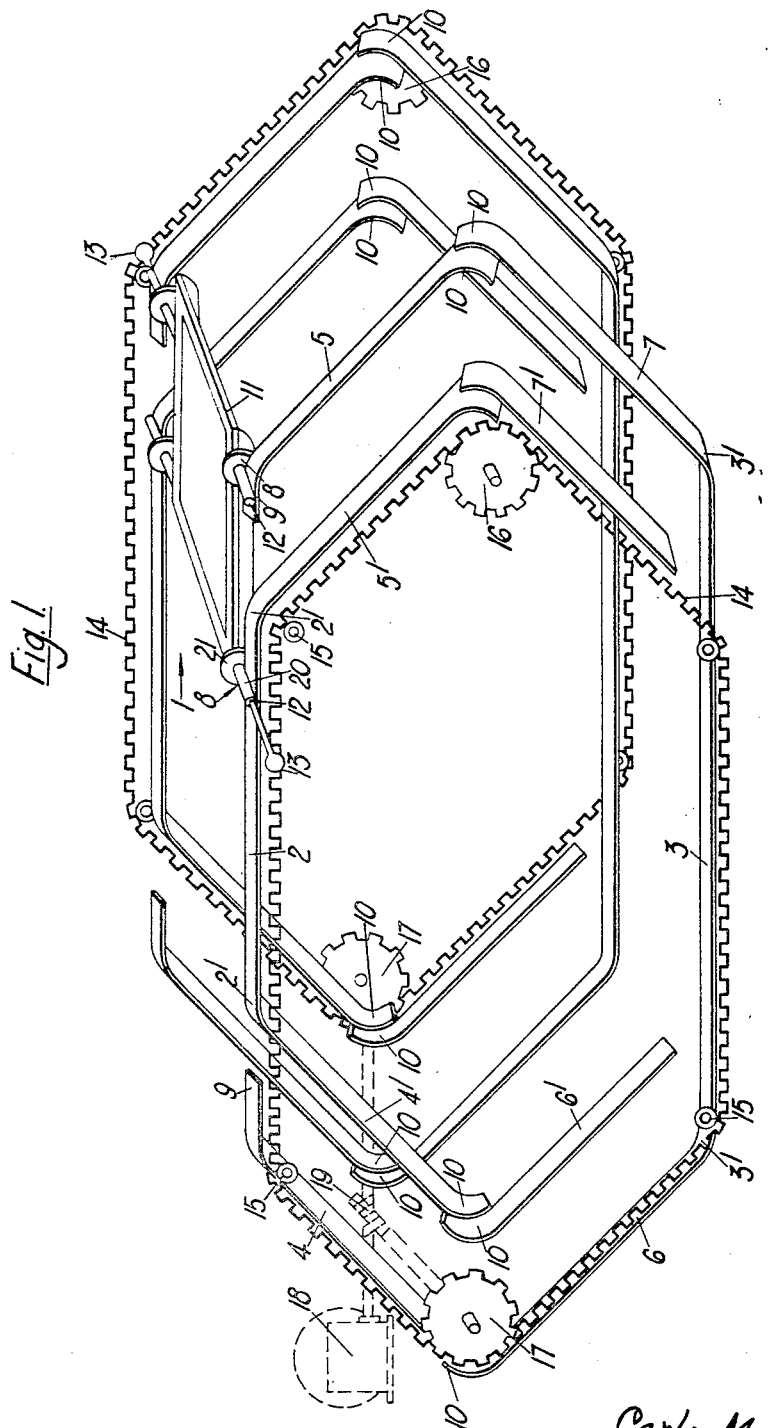
Inventor
Carlo Mascherpa
By
Stevens, Davis, Miller & Mosher
Attorneys

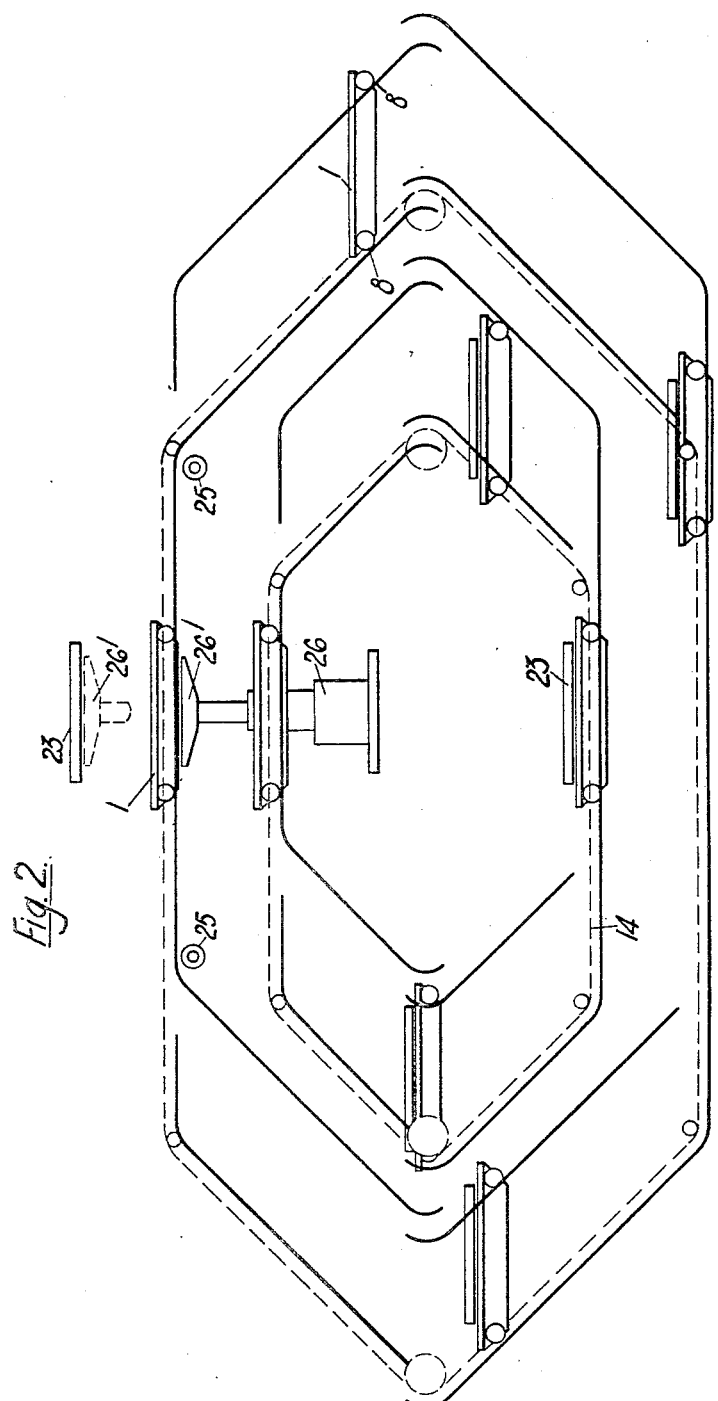

Oct. 15, 1968 C. MASCHERPA 3,405,795
APPARATUS FOR STOWING AND CONVEYING ARTICLES
Filed June 13, 1966 4 Sheets-Sheet 3
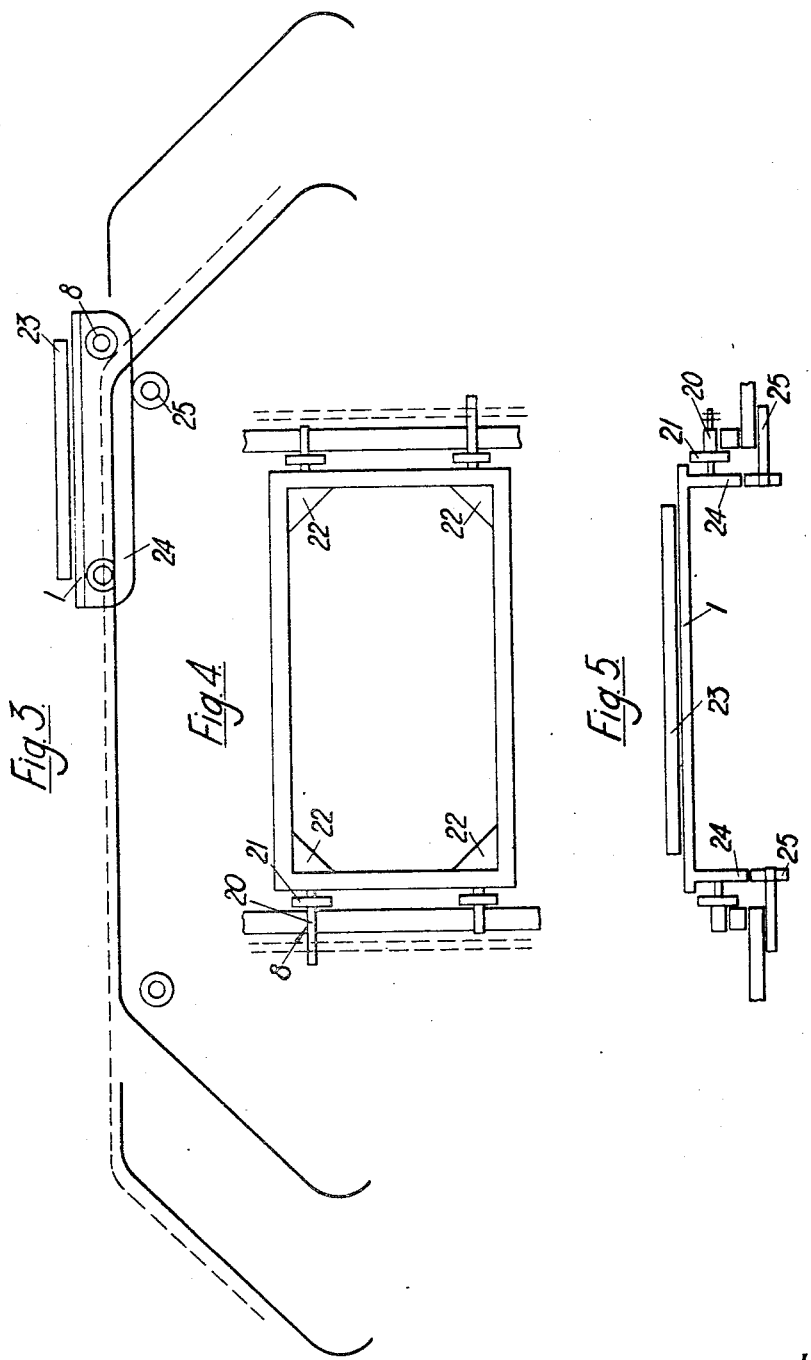
Inventor
Carlo Mascherpa
By Stevens, Davis, Miller & Mosher
Attorneys

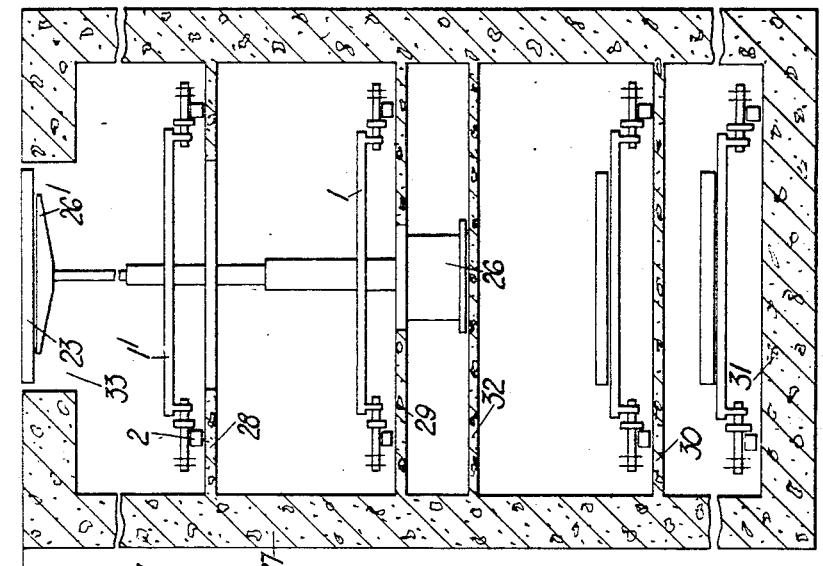
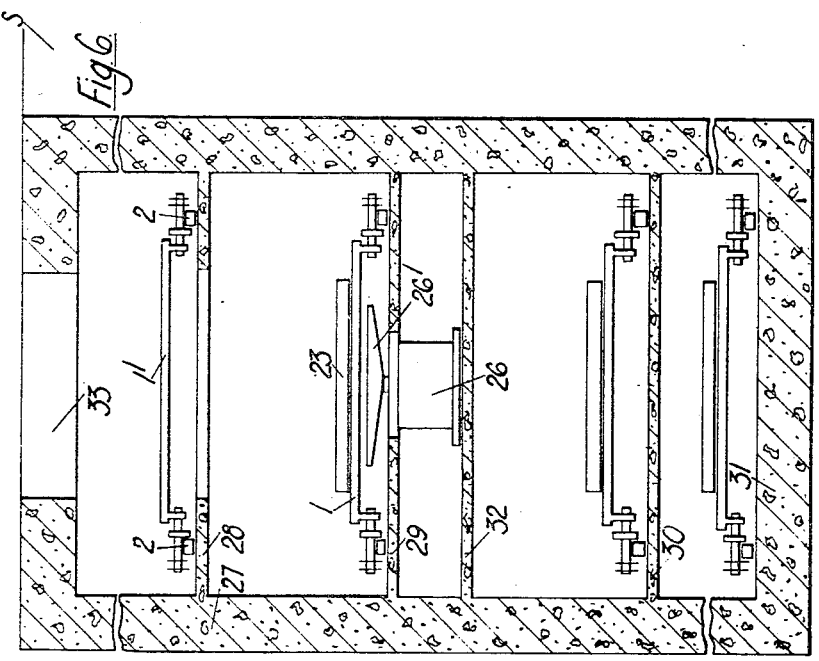

United States Patent Office 3,405,795
Patented Oct. 15, 1968

3,405,795
APPARATUS FOR STOWING AND
CONVEYING ARTICLES
Carlo Mascherpa, Corso Sempione 11, Milan, Italy
Filed June 13, 1966, Ser. No. 557,212
Claims priority, application Italy, June 12, 1965,
5,751/65
8 Claims. (Cl. 198—138)

ABSTRACT OF THE DISCLOSURE

Apparatus for the parking of automobiles comprising at least one plurality of carriages having two axles and four wheels, said carriages being interconnected by chain means causing their forward movement in a continuously horizontal position along a loop-shaped runway determined by fixed tracks, the wheels constantly rolling and bearing on said tracks.

---

The present invention relates to an apparatus for stowing and transporting articles, particularly for use in the parking and/or garaging of automobile vehicles and of vehicles in general, but being adapted for a wide variety of uses and applications.

It is known that the increasing urban vehicular traffic and the similarly increasing number of automobiles in circulation and standing in large towns has become intensified and has posed seriously the problem of parking and garaging automobiles in overcrowded cities, due to the saturation on the one hand of the road space available for parking and on the other hand of existing garages. For many years attempts have been made to solve this problem by the construction of parking places and garages of high capacity and requiring limited space above or below ground level. Although many and various solutions have been proposed, none of them has been satisfactory because of the high cost (which has limited use even in countries and cities well developed economically) and the lack of space (which has permitted construction only where considerable areas are available). On the other hand the proposals that have actually been put into operation hitherto have been installations of considerable size, adapted for stowing a very large number of vehicles, and have not been applicable to the more modest requirements of small industrial and residential settlements.

The present invention has the object of eliminating all these drawbacks, which have hitherto retarded the development of parking and garage facilities, to the extent that is desirable, and of providing a structure of low cost, of simple construction and easy manufacture, of limited dimensions in relation to the number of automobiles that can be stowed, and also capable of being constructed economically either on a small or large or very large scale, for stowing about 15–20 vehicles.

The apparatus is thus suitable not only for large urban parking or garage structures or for particular civil or industrial settlements which are served by a large number of automobiles, but also for association with buildings such as residential dwellings, small industries, offices, theatres, shops and so on.

The apparatus according to the invention is of the type comprising at least one plurality of supporting and conveying units mutually interconnected at predetermined intervals, movable in continuously horizontal positions on a runway which is provided with fixed tracks for guiding the supporting members of the said unit, and is characterised in that the supporting and conveying unit is provided along the continuity of the support by the said track and by fixed auxiliary means associated therewith, the means for interconnecting the units also serving to produce the control movements.

Preferably the said supporting units are constituted by carriages provided with supporting members in the form of four wheels and the said tracks on which the said wheels rest and run comprise on each side of the carriages a pair of parallel horizontal lengths common to the two wheels on the said side and four pairs of inclined parallel lengths which diverge outwardly substantially at the ends of the said horizontal lengths with equal and opposite inclinations, one for each wheel on the said side. The means for interconnecting the carriages are preferably constituted by chains mounted offset on the tracks on one side and the other of the carriages, the chains being caused to rotate by at least one reduction motor and being each drivably connected to one of the axes of the carriages, at diagonally opposite prolongations of the said axes. The apparatus may include various pluralities of supporting units or carriages, each associated with its own track, the tracks of the various pluralities being mounted concentrically. In this case there is used for loading and unloading of the carriages a single elevator adapted to raise the movable floor of the carriage to be loaded or unloaded, causing it to pass through the empty frames of special carriages provided in each plurality and suitably arranged in vertical alignment with the first carriage.

The apparatus is contained within a supporting structure, preferably in the form of a monolithic enclosure of reinforced concrete buried in the ground, which is provided with hatchway means adapted to receive at ground level the loading floors of the carriages, for the loading and unloading thereof.

An embodiment of the invention will now be described in detail, by way of example, with reference to the accompanying drawings, in which:

FIG. 1 is a diagrammatic isometric projection of the essential parts of the apparatus according to the invention, FIG. 2 shows in side view the same apparatus as FIG. 1, but comprising two pluralities of supporting and conveying units instead of only one, FIG. 3 illustrates a detail of FIG. 2, on a larger scale, FIGS. 4 and 5 show in plan and front view respectively the engagement of a carriage with the tracks and fixed auxiliary supporting means, and FIGS. 6 and 7 illustrate the apparatus in section as viewed from the front, in a supporting structure of buried reinforced concrete.

In FIG. 1 there are shown tracks for supporting the supporting and conveying units, and one of these units. The tracks are formed, on each side of the carriage 1 constituting the said unit, from a pair of parallel horizontal bars 2 and 3 arranged respectively above and below four pairs of parallel inclined bars 4, 4', 5, 5', 6, 6', 7, 7', of which the bars 4' and 5' constitute inclined prolongations of the upper horizontal bar 2, to which they are connected by curved connecting zones 2', and similarly the bars 6 and 7 constitute prolongations, in the opposite direction to the two preceding bars, of the lower horizontal bar 3 to which they are connected by curved connecting zones 3', the remaining bars 4, 5 and 6', 7' each being separate pieces, the first two 4 and 5 ending at a distance greater than the diameter of the wheel 8 of the carriage 1 from the connecting zones 2' and having suitably bent ends 9, and the second two 6' and 7', ending, conversely, at a distance less than the diameter of the said wheel 8 above the lower horizontal bar 3. All the inclined bars 4 to 7' end at their adjacent ends in curved extensions 10 of the same shape, parallel to one another and being spaced from the ends of adjacent bars by distances equal to the diameter of the wheel 8 of the carriages, that have to pass from one extension to the other whilst running on both of them during the transition. The tracks on the other side of the carriage are exactly similar to those already described, and are parallel to them.

The carriage 1 is formed from a robust rectangular frame 11 mounted on four wheels 8 having axes 12. The axes of two diagonally opposite wheels 8 are prolonged by devices 13 for engagement with chains 14 for spacing and controlling the movement of the carriages. The chains 14, which run on guide rollers 15 and on a sprocket wheel 16 and are driven by a second sprocket wheel 17 rotated directly by a reduction motor 18 via a suitable transmission 19, are mounted on both sides of the carriage parallel to the two tracks and are offset, the chain on one side being displaced to the left in FIG. 1 relative to the other chain which is located to the right. The left-hand chain engages the device 13 at the left-hand side on one side of each carriage and the right-hand chain engages the right-hand device 13 on the other side, in such manner as to drive the carriages 1 along the prescribed path in a perfectly balanced manner.

In the embodiment shown, the various lengths of the tracks are formed by simple flat lengths of metal and the wheels 8 comprise a roller portion 20 and a guide disc portion 21. The frames of all the carriages (less one, of which mention will be made below) are mounted on the tracks at equal distances from one another, and carry at their internal angles of the structure flat triangles (gussets) 22 applied for example by welding on laminar elements, to which are applied the loading floors 23 which are removable merely by lifting them from the carriages (FIGS. 4 and 5). Further, the long sides of the frame which correspond with the tracks, project vertically downwardly at 24. In order to support the carriage and keep it horizontal these long sides are arranged to engage with idler wheels 25 provided (see FIGS. 2 and 3) at the connecting zone 2', in order to obtain correct passage of the carriages from the upper horizontal bar to the inclined bars of the tracks.

The carriage assemblies 1 associated with a track need not be just one in number. FIG. 2 illustrates an apparatus which employs two of them, with corresponding concentric tracks, these also being of the most simple construction. In general there the apparatus will tend to have a number of carriages and of related tracks equal to or larger than two.

As can be seen in FIG. 3, each carriage assembly is completely independent of the other and there is no mutual interference. When loading and unloading the working floors of the carriages, however, the particular concentric arrangement of the various tracks should be considered. This is obtained, in accordance with the invention with a relatively simple and practical system. At the centre of the central carriage assembly is located an elevator 26 which operates hydraulically or mechanically, and the lifting floor 26' of which is adapted to engage internally and beneath the loading floor of a carriage on the inner track and to raise it to the exterior of the apparatus, with or without its load.

In order to achieve the above, one carriage on each of the outer loops of tracks is formed merely from a frame and wheels and does not have a loading floor and supporting gussets as do the other carriages of the particular outer loop. In this manner, before operation of the elevator 26, the open carriage of each outer loop may be placed in vertical alignment with the particular carriage of an inner loop to be unloaded. Thus the elevator, after receiving the load from the latter carriage, can move outwardly through the open carriage of each outer loop to the positions shown by 26' in FIG. 2. Of course this provision of the open carriages is necessary only when a plurality of interconnected carriages are provided which form an endless loop extending around the outer loops of tracks.

Preferably the apparatus according to the invention— which in any case must be contained in a carrying structure—whether installed at ground level or underground— is mounted in the interior of a housing of reinforced concrete intended to be constructed below ground. FIGS. 6 and 7 show such a structure, indicated generally at 27, with the internal apparatus, with the elevator lowered and raised respectively. As can be seen, the housing 27 comprises ceilings 28, 29, and 30 and a base 31 for supporting the bars of the horizontal track, a central ceiling 32 for supporting the elevator 26, and a hatchway 33 for the emergence of the loading floors at ground level S for the loading and unloading operations.

According to the essential feature of the invention, the carriages 1 move whilst being substantially continuously supported by the tracks and hence with a smooth and uninterrupted transition between the bars thereof. These transitions occur with simple rolling motions between the bars 4', 2 and 5' and between the bars 7', 3 and 6, with guided support between the bars 7', 3 and 6' and with double guiding and inversion of support between the bars 4, 6; 4', 6'; 5', 7' and 5, 7 afforded by the curved extensions 10. One particular transition, however, is that which the wheel 8 has to make between the bars 2 and 5 or 2 and 4 or more exactly between the bar 2 and the extension 9 of the bar 4 or 5. The discontinuity at this point of the track—longer than the diameter of the wheel 8—is overcome by using the wheel 25 which is mounted idly on the housing and permits the carriages to remain in their horizontal positions—engaging the lower edges of the projections 24—until one of the pairs of wheels 8 passes on to extension 9. The action of the wheels 25 is illustrated in detail in FIGS. 3 and 5. The continued support of the carriages 1 is of the highest importance in that it enables the chains 14 to have a driving function exclusively and no supporting action, with great advantage as regards reliability of operation and correct dimensioning of the parts. The control system that regulates the movements of the various carriage assemblies is thus centralised and enables predetermined positions to be allocated to the various chains of the carriages. In each of these positions one carriage is always located centrally on its own length of the track 2 in alignment with the elevator 26.

The carriage that it is desired to load or unload should in particular be appropriately disposed properly in this position when these operations are to be effected. For this purpose there is provided an apparatus which is automatic and of a well known type and which need not be described in detail. For each loading and unloading operation there will in general first be a movement of at least some of the plurality of carriages along the appropriate track until one of the carriages has its loading floor vertically above the elevator. The elevator then comes into operation, first moving upwardly and then downwardly. Of course, accessory elements may easily be provided for facilitating the use of the apparatus or for adapting it for various requirements. In particular, for example, elements may be provided for closing the hatchway 33, and for opening it only at the time when loading or unloading is to be effected. Any of these operations may of course be automatic.

Although it will easily be seen that the apparatus described is suitable in particular for use in parking or garaging automobiles, it is not necessary to stress its suitability for other fields involving storage or sheltering. It is in fact clear that it can be usefully employed for solving all problems such as require rapid selection of various quantities of merchandise, manufactured articles and so on.

What I claim is:

1. Apparatus for stowing and conveying articles comprising a plurality of carriages, each having two axles and four wheels; at least one loop-shaped runway means for said carriages, said runway means comprising upper and lower horizontal track members for said carriages, said horizontal track members being disposed in parallel relationship and their ends extending outwardly into integral projections in an equal and opposite angle of inclination from said horizontal track members, said projections adapted to be engaged by one wheel on each side of each of said carriages, and an individual slanting track member extending parallel and spaced laterally from each of said projections in a common vertical plane with said projections, said slanting track members adapted to be engaged by the other wheel on each side of said carriages, said other wheels passing through spaces wider than their diameter when passing between said upper horizontal track members and their corresponding slanting track members; a fixed axle idler wheel disposed within the apex of said angles of inclination of said integral projections with said upper horizontal track member and adapted to be engaged by said carriages to provide a secondary supporting surface for said carriages during passage of said other wheels through said spaces; and drive means to drive said carriages over said runway means.

2. Apparatus according to claim 1, wherein depending flanges are formed on said carriages and adapted to be engaged by said idler wheels.

3. Apparatus according to claim 1, wherein said projections of the horizontal track members terminate with parts curved according to the curving radius of the carriage wheels and the individual slanting track members terminate at one end with curved parts similar to those of said projections and with said parts facing the corresponding parts of the oppositely slanting projections at a distance approximately equal to the diameter of the carriage wheels.

4. Apparatus according to claim 3, wherein the ends opposite to the curved part ends of the individual slanting track members are bent, in the upper individual slanting members, to form an extension of the upper horizontal track member, spaced from said last horizontal member at a distance above the diameter of the carriage wheels, whereas in the lower individual slanting members, they terminate without bending at a distance below the diameter of the carriage wheels from the lower horizontal track member.

5. Apparatus according to claim 1, wherein said drive means comprises a pair of chains mounted offset on the tracks and carriage sides and each connected to one of the two carriage axles, at least one reduction motor, and at least one sprocket wheel operatively connecting said motor to each chain.

6. Apparatus according to claim 1, wherein each carriage is formed with a stout external frame and with a loading floor bearing on four gussets provided on the inside angles of the frame and adapted to be lifted for the loading and unloading operations, and further comprising an elevator which is mounted inside said tracks to carry out the lifting of the carriages loading floor when the latter are standing on the upper horizontal track member.

7. Apparatus according to claim 1, wherein a plurality of runway means are provided disposed in a concentric relationship, the carriages on the inner runway means being provided with removable floors and at least one carriage on the outer runway means being open, and further comprising elevator means disposed inwardly of the innermost runway means and having a lift floor adapted to remove said removable floors outwardly through an open carriage on the outer runway means.

8. Apparatus according to claim 1, wherein a plurality of interconnected carriages are provided on each runway means, said interconnected carriages forming an endless loop.

References Cited
UNITED STATES PATENTS
| | | | |
|---|---|---|---|
| 1,771,022 | 7/1930 | Wachs et al. | 214—16.1 |
| 2,874,822 | 2/1959 | Coursey | 214—16.1 |
| 3,166,180 | 1/1965 | Sonderegger | 214—16.1 XR |

FOREIGN PATENTS
| | | |
|---|---|---|
| 1,341,811 | 9/1963 | France. |
| 613,530 | 5/1935 | Germany. |
| 510,491 | 1/1955 | Italy. |

GERALD M. FORLENZA, *Primary Examiner.*

R. B. JOHNSON, *Assistant Examiner.*